W. J. PHELPS.
MECHANISM FOR SOLDERING THE END SEAMS OF CANS.
APPLICATION FILED FEB. 15, 1909.
949,330.
Patented Feb. 15, 1910.
3 SHEETS—SHEET 3.
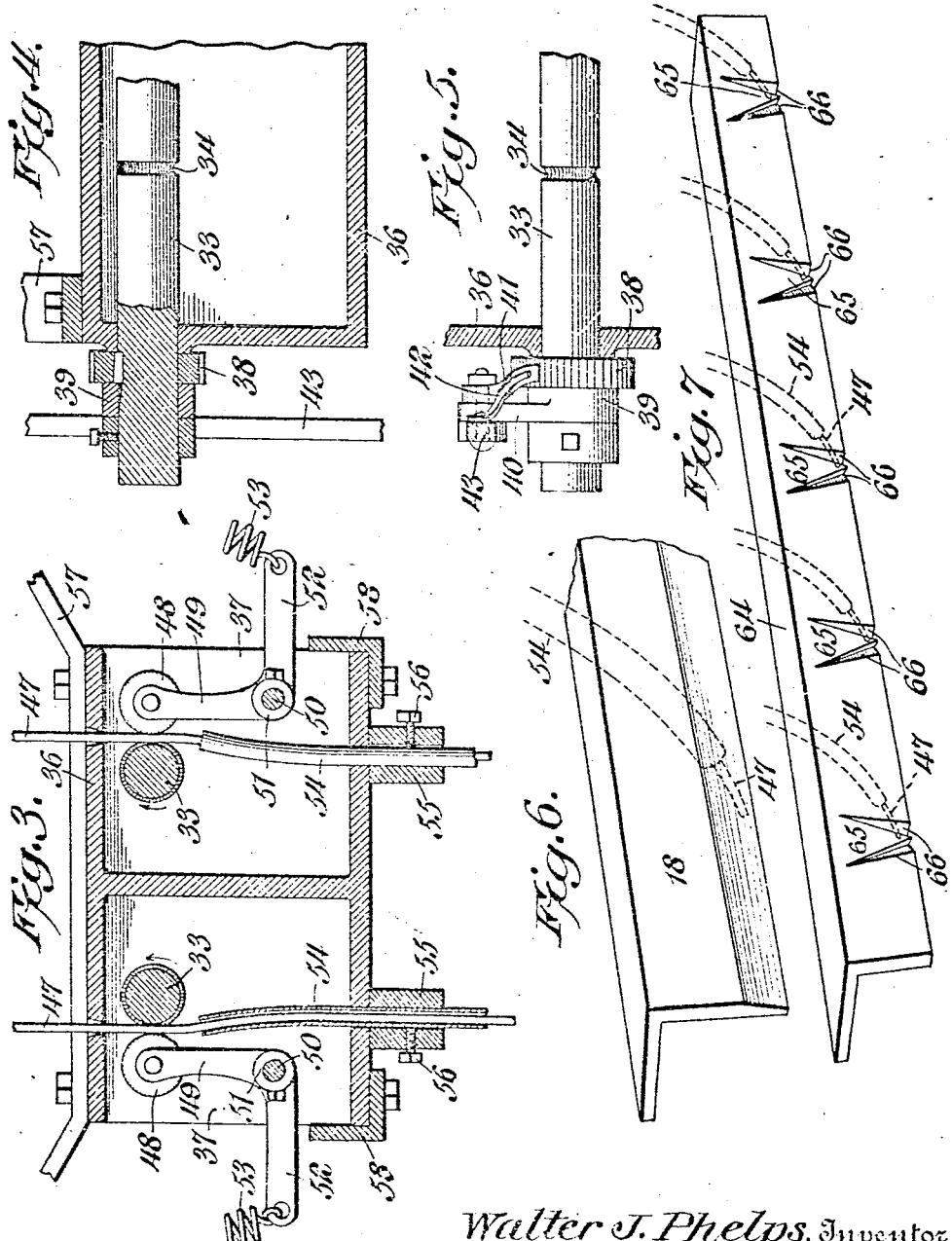
Walter J. Phelps, Inventor,
Witnesses
Howard D. Orr.
Frederick B. Wright
By E. G. Siggers
Attorney

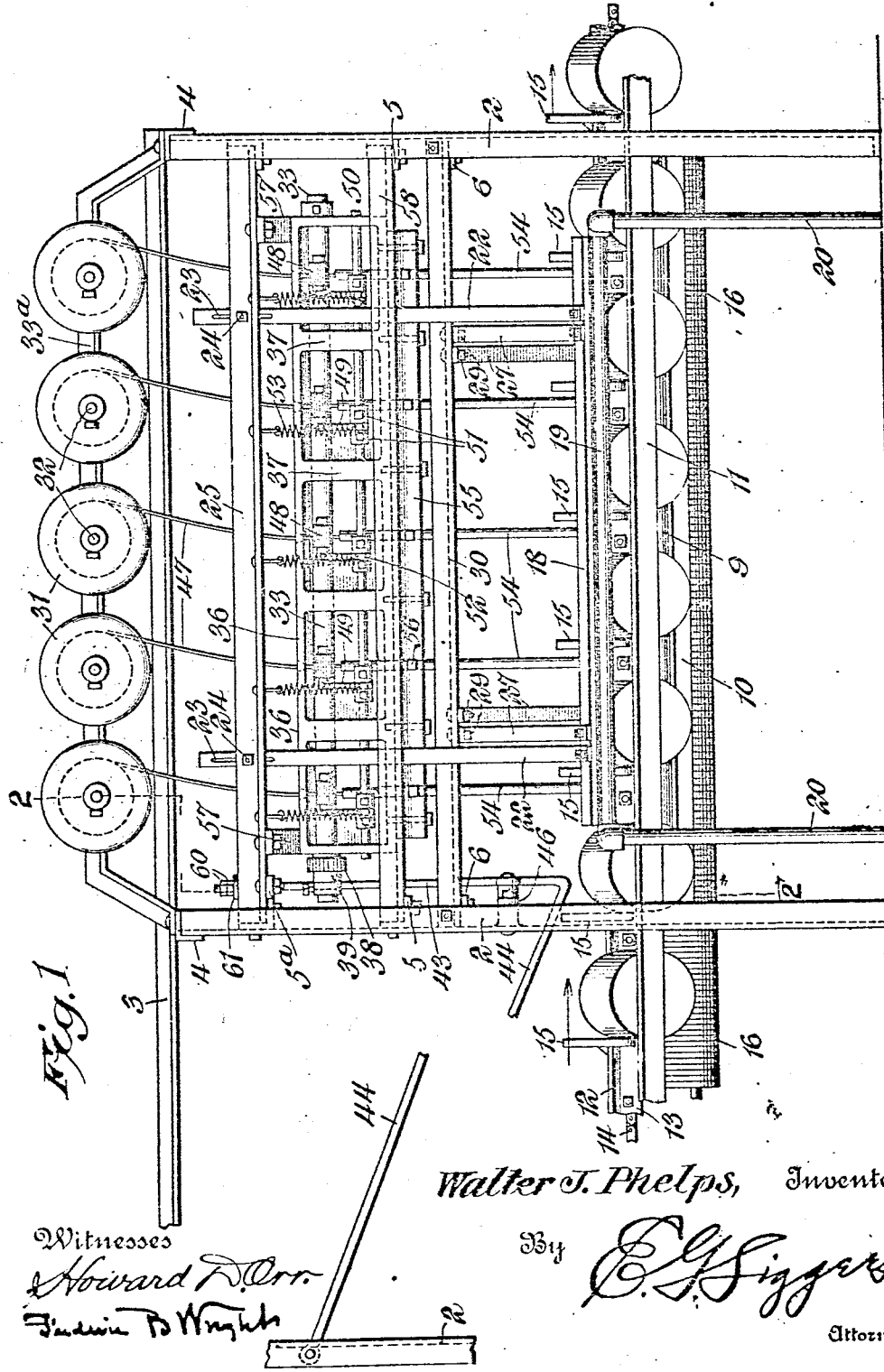

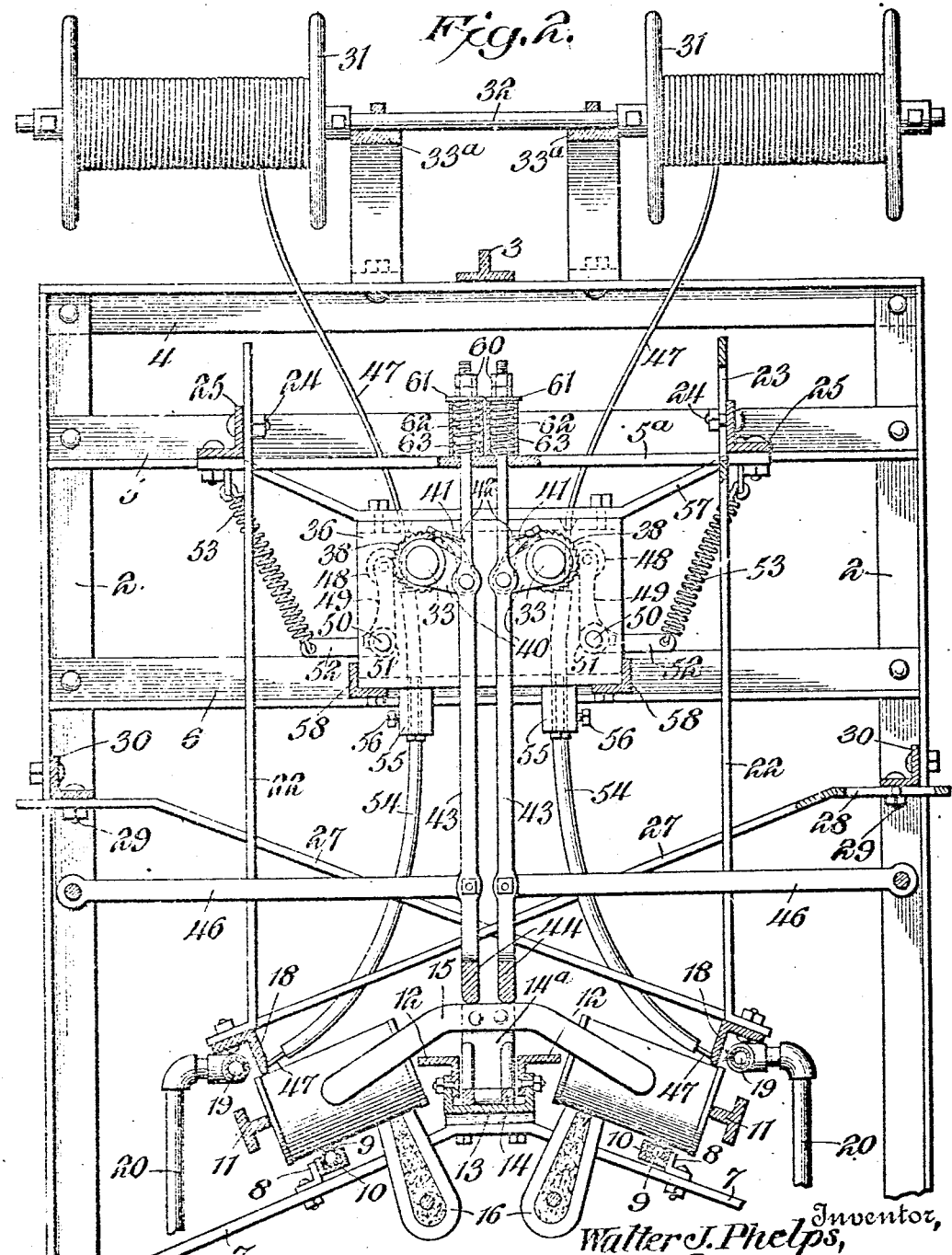

UNITED STATES PATENT OFFICE.

WALTER J. PHELPS, OF BALTIMORE, MARYLAND, ASSIGNOR TO AMERICAN CAN COMPANY, OF NEW YORK, N. Y., A CORPORATION OF NEW JERSEY.

MECHANISM FOR SOLDERING THE END SEAMS OF CANS.

949,330.  Specification of Letters Patent.  Patented Feb. 15, 1910.

Application filed February 15, 1909. Serial No. 477,982.

*To all whom it may concern:*

Be it known that I, WALTER J. PHELPS, a citizen of the United States, residing at Baltimore and State of Maryland, have invented a new and useful Mechanism for Soldering the End Seams of Cans, of which the following is a specification.

My invention relates to floaters or apparatus used for soldering the end seams of cans, and particularly to the soldering iron therefor, means of heating said iron, means of adjusting the iron, mechanism for intermittently feeding the solder against the iron, and to certain other improvements and additions to the can soldering mechanism as shown in my application, Serial No. 434,345, filed May 22, 1908.

Continuous solder feeding mechanism, such as is shown in my former application above referred to, while successful to a great extent, is open to the objection that the feed of the solder cannot be regulated to an exact and definite degree, and that with a feed such as heretofore described it was impossible to control or regulate the feed in the delicate manner required to suit the slightly varying diameters of different can bodies.

In soldering a can with my apparatus a plurality of solder wires is used. Each of these wires is fed against the iron but only a fraction of an inch is required for each can and the amount required is only slightly increased or decreased relatively for the largest or smallest sizes. Hence, it is obvious that a solder feed mechanism must be used which shall be susceptible of delicate regulation and that the solder should be fed forward against the iron a definite amount just prior to the arrival of a can at the soldering point. If this is not done, solder will be either wasted or not enough solder be presented.

The main object of this invention, therefore, is to provide a solder feeding mechanism which shall so intermittently feed the solder and which may be easily regulated and adjusted to suit the slight variation in the feed required for soldering cans of different sizes.

Another object of the invention is to provide a soldering iron of such construction that the solder may be fed against the face thereof at a point slightly above the soldering edge of the iron so that the solder as melted will be carried down to the soldering edge of the iron and be carried forward along the edge or rolled before the can in its rolling movement against the iron, thus not only distributing the solder properly upon the can, but also distributing it upon the lower edge of the iron whereby the iron is kept bright and tinned.

A minor object in this connection is to provide means whereby the melted solder shall be directed down to the edge of the iron in the form of a drop and not permitted to spread until it reaches the lower edge of the iron. In connection with the iron I also provide means whereby the iron may be adjusted while heated without the necessity of actual manual contact with the heated iron. This, it is obvious, is an important improvement, as unless some such arrangement is used, the machine must be stopped and the iron allowed to cool before the proper adjustment can be made.

Another object of the invention is to provide an iron having heating means on its rear face and a shield extending over the heating means and preventing the heat of the irons from softening the bar or wire of solder at a point above its contact with the iron. This matter of solder feed and solder heating is of vital importance and though it would seem at first sight that slight variations in the feed and heating would be negligible quantities, yet, when it is remembered that some fifty thousand cans per day are ordinarily run through a floater, the importance of slight adjustments and slight saving of solder will be appreciated. It is also of great importance that the solder should be fed precisely to the proper place on the can, else the solder is wasted and the seam is not properly filled. Again, if the solder is fed too fast it will not be melted, but the wire or rod of solder will contact with the soldering iron and be bent down, thus giving too much solder to each can or causing a length of solder to depend below the soldering iron and to ride upon the can in its passage, which will eventually be broken off and wasted while the can receives no solder at all. If the heat of the iron is too great and the feed too slow, the melted solder will be allowed to back up on the unmolten or solid solder wire and as a consequence at succeeding forward feeds of the solder wire many of the cans will receive either no solder or less than the proper quantity. The softening of the solder wire above the soldering iron will also cause the solder to drop and strike the can before striking the iron. The solder will be deflected and bent to one side or the other of the can, or if it strikes the iron at all, it will be improperly directed, and therefore improperly placed on the can and the seam will not be filled. These defects are obviated by the construction which I have devised and I have found in actual practice that solder fed by the mechanism now to be described will be fed in precisely the proper amount, will be directed to precisely the proper place on the can, that there will be no waste of solder and that the feed of solder can be accurately regulated for each class of cans.

In the drawings, Figure 1 is a side elevation of the soldering end of an end-seam machine or floater, such as is shown in my prior application above referred to; Fig. 2 is a transverse section of a part of the structure shown in Fig. 1, the section being taken on the line 2—2. Fig. 3 is an enlarged section of the casing inclosing the solder feed wires and idlers; Fig. 4 is an enlarged fragmentary detail section of the casing transverse to Fig. 3, the feed roll being partly in section; Fig. 5 is an enlarged fragmentary detail view showing the feed roll and its ratchet gear in elevation; Fig. 6 is a fragmentary enlarged perspective view of the solder iron shown in Figs. 1 and 2; Fig. 7 is a perspective view of a modified form of solder iron.

Certain portions of the apparatus, namely, the supporting framework, the can conveyer, the yielding trackway or bed and the magnetic tractors for increasing the adhesion of the cans to the track and compelling them to roll beneath the solder iron, are constructed as described in my prior application. It is, therefore, sufficient to say that the framework of the floater consists of the vertical standards 2, opposed to each other at intervals on opposite sides of the path of movement of an endless can conveyer. These standards are tied to each other in any convenient manner, as by the longitudinal angle irons 3 and 30. Cross braces 4, 5 and 6, connect the standards transversely. Supported on transverse irons 7, are the yielding rails or trackways 9, preferably of rubber tubing supported in channel irons, 10, attached to the irons, 7, by brackets 8. On this tubing the cans roll and are supported as they pass beneath the soldering irons. The transverse supports 7 are oppositely inclined from the middle to form trackways for two rows of cans, one on each side of the machine. Longitudinal guide rails 11 are supported above the trackways against which the outer ends of the cans engage, while angle irons, 12, attached to a middle channel iron, 13, form guides for the inner ends of the two rows of cans. The channel iron 13 forms a trackway for the links, 14, of an endless conveyer chain having at intervals upstanding plates 14$^a$ which are riveted to a cross bar, 15, having opposed outwardly and downwardly extending ends which contact with the sides of the cans to roll them along the trackways and beneath said soldering irons. This endless conveyer 14 is moved in one direction in any desired manner. Located beneath the path of movement of the cans on both sides of the center is a series of magnets 16, over which the cans roll, and which act as magnetic tractors, increasing the adhesion of the cans to the yielding bed rail, 9, and causing the cans to roll beneath the soldering irons as they are moved along by the conveyer blades 15. It is necessary to an understanding of the operation of my device that this fact be kept in mind: that the cans are rolled positively beneath the fixed soldering irons 18.

Just above the bars 11 are located the soldering irons 18. These are angular in cross section, one flange of the angle iron extending downward at a slight inclination toward the median line of the machine, the other flange of the iron extending outward from the upper edge of the iron. In the space formed between these two angular flanges is located the gas burner tube or other heater, 19, which is connected by the pipe 20 to any suitable gas supply. It will be seen that the heat from the burners is conserved by the uppermost flange of the iron and that the flame and heat of the burners are directed chiefly against the inside face of the downwardly extending flange. It will also be seen that the upper flange acts as a shield tending to prevent the passage of heat directly upward from the burners and so into contact with the solder, as will be later described.

In order to support the soldering irons I provide the vertically extending supporting bars, 22, which are bolted at their lower ends to the upper flange of the soldering iron, and at their upper ends are longitudinally slotted as at 23. A bolt 24 passes through the slot 23 and engages with an angle iron 25 which is supported by the transverse braces 5. Through the bolt 24 the bar 23 may be raised or lowered and clamped in any adjusted position, thus vertically adjusting the soldering irons. Also attached to the upper flange of the soldering iron is the transverse upwardly inclined adjusting bar 27, whose outer end is slotted as at 28. A bolt, 29, passes through the slot 28 and engages a longitudinally extending angle iron 30, which is bolted to the standards 2.

It is plain from the drawing and description that the rod 27 may be adjusted laterally and clamped in its adjusted position by the bolt 29, and that thus the soldering iron to which the bar 27 is connected, will be adjusted laterally. It is also obvious that by adjusting both bars 23 and 27, the soldering iron is held rigidly in position and yet may be set accurately in relation to the cans to be soldered. The particular advantage of this adjusting mechanism is that the iron may be shifted and set without the operator having to handle it. Inasmuch as this iron is continuously heated, it is obvious that to adjust it while the machine is working, would be inconvenient without special provision for this purpose. The bars 22 and 27 are of such length, however, that the heat from the soldering iron is dissipated before it reaches the slotted ends of the bars, and hence, that the bars may be adjusted without any danger of burning the fingers.

The constructions above described with the exception of the soldering iron adjusting mechanism are those shown and previously described in my prior patent and, hence, a more extended description of these parts is not necessary.

Supported in any suitable manner above the soldering end of the floater is a series of opposed solder-containing reels 31, which are mounted to rotate with or on the shafts 32 which are supported in any desired manner. I have shown the shaft 32 as supported in longitudinal angle irons 33ª, whose ends are extended downward and bolted to the transverse beams, 4. Any other arrangement, however, may, of course, be used. The reels, 31, being freely rotatable, it becomes necessary to provide a positive means of drawing the soldering wire from the reels and feeding it against the irons, 18. To this end I provide for each set of reels, that is, all the reels on one side of the machine, a common feed shaft which engages with the several soldering wires and is rotated by a step-by-step movement actuated by the passage of the conveyer blades 15 along the machine. This feed roller or shaft is designated 33, and a portion of it is shown in detail in Figs. 4 and 5. It consists of a shaft extending horizontally above the whole length of the soldering iron, this shaft having a series of annular recesses, 34, cut out from its periphery, one recess for each of the soldering wires. These recesses are slightly knurled or toothed so as to engage positively with the soldering wire and bite into the same.

The feed roller is supported in a longitudinally extended casing, 36, having a series of internal transverse walls, 37, acting as bearings for the roll, 33, and preventing the roll sagging in the middle. The ends of the roll are, of course, supported in the ends of the box or casing, 36, and project out therefrom as shown in Fig. 1. That end of the roll away from the exit end of the machine is provided with a ratchet wheel, 38, and surrounding the end of the roll is the loose collar, 39, having the arm 40 provided with the pawl 41 whose free end engages with the teeth of the ratchet wheel, 38, a spring, 42, forcing the pawl into engagement with the teeth. Connected to the arm 40 is the vertically extending rod 43 which at its lower end is bent rearwardly and upwardly as at 44, so as to form an upwardly inclined arm, or otherwise formed so as to rest upon and be engaged by the middle portion of the blades 15, as the blades move along the trackway. The outer end of the arm 44 is pivoted at or adjacent to the entrance end of the machine to give the arm 44 considerable length and a more gradual inclination. Preferably the portion 44 is pivoted in any manner between the uprights or standards, 2, situated as before stated, toward the entrance end of the machine. It will be obvious that the more gradual the inclination of the arm 44 and the greater the consequent length of this arm, the less the shock of impact when the blades 15 strike the portion 44 to raise the rods 43, and the less the wear of the parts 15 and 44. In order to steady the rods 43 I provide the laterally extending links 46 which are pivoted to the uprights 2 in any desired manner, these links rising and falling with the rise and fall of the rods 43.

To hold the soldering wires 47 in engagement with the feed rolls, 33, I provide pressure rolls, 48, one for each of the soldering wires, each roll, 48, being mounted on one arm 49 of a bell crank lever, these bell cranks being all independently and rotatably mounted upon a longitudinally extending shaft, 50. As shown clearly in Fig. 1, the bell cranks are held in position by opposed collars, 51, fast on the shaft 50, but of course, this manner of mounting the bell cranks may be modified without departing from the spirit of my invention. The shaft 50 extends entirely through the box or casing 36 and is therefore supported in the same manner as the roll 33. Each of the bell cranks has an outwardly projecting arm 52 to which is connected a retractile spring, 53, this spring being attached to the longitudinally extended angle irons 25, and the springs act to turn the bell cranks and force the pressure rollers 48 against the wires 47, thus holding the wires in the recesses 34 with a constant pressure which yet allows the roll to accommodate itself to the inequalities of the wire. The bottom of the box or casing, 36, is formed with a series of openings through which pass outwardly and downwardly curved solder guiding tubes, 54, which are supported in position upon the bottom of the casing by a bar, 55, having set screws, 56. These tubes extend upward into the casing with their open ends immediately beneath the junction of the two rolls 33 and 48 and the lower ends of these guide tubes. 54, diverge from each other and extend downward to a position adjacent to the inner face of the soldering irons as shown clearly in Fig. 2, so that the solder is delivered against the beveled face of the soldering irons. Each of the soldering irons preferably has a beveled face. The casing 36 is supported by transverse depending strap irons, 57, which are bolted to the angle irons 25 as shown in Fig. 1. The casing may be also supported by the longitudinal angle irons 58 which are supported on the transverse irons 6 as shown in Fig. 2. Of course, I do not wish to be limited to this manner of supporting the case, as any other may be used, but I have found this to be a simple and rigid manner of supporting the solder-feeding mechanism.

At their upper ends, the rods, 43, pass through the strap iron 5ª, and are provided on their extremity with the set nut, 60 and washer 61 (see Fig. 2). Spiral springs, 62, are interposed between the washer 61 and the longitudinal horizontal flange 5ª of the iron 5 (see Fig. 2). A sleeve 63 surrounds the springs, the washer 61 being larger than the sleeve. These springs lessen the noise which would otherwise occur caused by the falling of the rods, 43. As the blades 15 pass the lower ends of the rods 43, the springs take up the shock of this falling movement.

The sleeves, 63, act as stops to the washers 61, the nuts 60 permitting the washers to be adjusted on the rods 43. The higher the washer is on the rod 43, the greater the distance through which the rod falls. The adjustment of the rods 43 regulates the distance through which the rods 43, with their rearwardly bent portion 44, shall descend between the blades 15 after each one of the blades passes the junction of the arm 44 and the rod 43. The junction of the rod 43 with the arm 44 is rounded as shown in Fig. 1 to permit the gradual lowering of the rod 43 as the blade 15 passes. It is on this downward movement of the rods 43 after the blade 15 has passed that the pawl 41 passes over the ratchet 38. Hence, by regulating the extent of the downward movement of the rods 43, the amount of feed can be also precisely regulated. The feeding movement, of course, takes place upon the contact of blades, 15, with the lower bent ends of the rods 43, and the consequent raising of these rods. As the rods 43 are raised the pawl engages with the ratchet of the roller, 33, and all the wires, 47, are fed forward a definite amount. As the wires are spaced longitudinally a certain definite distance along the soldering iron, and as the feed is controlled by the raising of the rod 43 through the blade 15, it will be seen that the solder is fed forward before each of the cans and that it is thus fed forward against the face of the iron just previous to the passage of a can beneath that particular solder point so that the solder is melted, flows down the iron to the edge thereof, and is immediately engaged by a can. The solder flows beneath the edge of the soldering iron and as a consequence the irons have a wiping soldering action against the seam of the can, which forces the solder into the seam and practically precludes the possibility of a seam being left unfilled or unsoldered.

While I may use a soldering iron with a beveled edge, such as shown in Fig. 6, and find that such a soldering iron is effective in practice, yet in Fig. 7 I show a form of iron wherein the drop of molten solder is positively guided down to one point on the iron so that there is no chance of the solder spreading over the face of the iron and thus not being properly distributed upon the can. To this end I form the inner downwardly extending face of the iron 64 with a series of wedge-shaped guiding portions 65 and deliver the solder against the face of the solder guiding portions as shown in dotted lines. Preferably I form this wedge-shaped solder guiding portion by grooving the inner face of the iron 64, said grooves 66 being conjoined with each other at the lower edge of the iron and diverging from each other as they extend upward. Solder applied at any portion of the wedge-shaped tongue 65, will flow downward until it reaches the extreme lower point of the tongue, the grooves 66 on both sides preventing the solder from spreading away from the tongue, and the point of the tongue directing the solder in a drop upon the can itself. This is particularly advantageous inasmuch as the drop of solder collected at the lower end of the tongue will be intercepted by the advancing can and will be rolled along with the can beneath the edge of the iron in the manner before explained. Thus the solder will be properly distributed along the seam and the lower edge of the iron will be kept bright and tinned.

The operation of my invention will be obvious from this description. The conveyer 14 with its blades 15, rolls the can along the trackway towards the soldering device. Just before one of the blades 15 reaches the entrance end of the soldering irons, the blade will strike the lower end of the arm 44 and will, of course, vertically lift the arms 44 and the rods 43. As they are lifted the feed rollers 33 will be turned and the soldering wires 47 fed forward about an eighth of an inch for ordinary sized cans. The solder will be projected against the face of the iron just in advance of a can as before explained, will be melted, flow down to the edge of the iron and be intercepted by the can which has arrived immediately beneath the solder point at this time. As each of the blades 15 passes the end of the arms 45, the arms with their rods, 43, will, of course, descend as far as they are allowed to do by the sleeves 62, and the washer and nuts 60 and 61. Upon this descent of the rods 43, the pawls will be moved backward over the ratchet 38 ready for a new feed of the solder. It will be seen that the solder is fed forward as the can advances toward the soldering point and that thus when the can has arrived at the soldering point a drop of solder is collected on the lower edge of the iron and is, as before explained, intercepted by the can. This arrangement has one important advantage, that the solder is not fed against the iron when it is not needed, with the consequent liability to waste, but that the forward feed corresponds to the arrival of a can in proximity to the soldering point and its forward movement toward the soldering point.

My invention I have found exceedingly effective in practice. It permits of a precise regulation of the solder feed and of an easy adjustment of this feed. It is obvious that the adjustment of the rods 43 may be relatively coarse and yet secure a fine adjustment of the pawl in relation to the movement of the ratchets. I have found in practice that this adjustment is exceedingly accurate and delicate, and that the soldering wires may be fed precisely to the amount regulated for each particular size of can and with regard to the heat maintained in the soldering irons themselves.

While I have shown a supporting structure which I have found effective in practical use, I do not wish to be limited to this, as it is obvious that the apparatus may be supported in any other manner without departing from the spirit of my invention. I also do not wish to be limited to the exact details shown, as there are many changes which might be made whereby the same result could be secured, though not in so effective a manner.

Having thus described my invention, what I claim as new and desire to secure by Letters-Patent, is:

1. In a can soldering machine, the combination with a can runway, of means for rolling cans upon and along said runway, a soldering iron above the runway with which the cans have rubbing contact as they roll along the runway under the soldering iron, and means for intermittently feeding solder against the face of said iron.

2. In a can soldering machine, the combination with a can runway, of means for rolling cans upon and along said runway, a soldering iron above the runway with which the cans have rubbing contact as they roll along the runway under the soldering iron, and means for intermittently feeding solder against the face of the iron, and means for regulating the amount of solder feed.

3. In a can soldering machine, the combination with a longitudinally extended soldering iron, of a runway for the cans beneath the soldering iron, means for rolling cans along said runway and in contact with the soldering iron, and means for intermittently feeding solder at a series of points on said iron.

4. In a can soldering machine, the combination with a can runway, of means for rolling cans upon and along said runway, a soldering iron above the runway with which the cans have rubbing contact as they roll along the runway under the soldering iron, and means for feeding solder against the face of said iron, means for controlling the feed of the solder by the can rolling means.

5. In a can soldering machine, the combination with a soldering iron, and means for rolling cans beneath said iron and in contact therewith, of means for intermittently feeding solder against the face of the iron in advance of the approach of a can to the soldering point.

6. In a can soldering machine, the combination with a can runway and a longitudinally extended soldering iron above the runway and with which the cans rolling upon and along the runway have a rubbing contact, of a series of solder guides arranged adjacent to the iron and adapted to deliver the solder against the face of the iron, of a conveyer for the cans, and means controlled by the movement of the conveyer for intermittently feeding forward solder through said solder guides and against the face of the iron.

7. In a can soldering machine, the combination with a runway, a fixed soldering iron above the runway, and a conveyer having upstanding blades by which said cans are carried along the runway, of means for feeding solder to the iron, and means controlled by the approach of said conveyer blades for feeding solder against the iron to a definite amount.

8. In a can soldering machine, a solder wire-containing reel, a soldering iron, a can runway below and parallel to the soldering iron, means for rolling the cans upon and along the runway and in rubbing contact with the soldering iron, a feed mechanism engaging the solder wire to force it into contact with the iron, and reciprocating mechanism connected to operate said feed mechanism, said reciprocating mechanism being actuated in accordance with the passage of the cans.

9. In a can soldering machine, a solder wire-containing reel, a fixed soldering iron, a conveyer arranged adjacent to the soldering iron and adapted to roll cans beneath said iron, a feed mechanism engaging the solder wire to force it into contact with the iron, and reciprocating mechanism connected to operate said feed mechanism, said reciprocating mechanism being actuated by the can conveyer to intermittently feed the solder wire against the iron.

10. In a can soldering machine, a can runway, means for rolling the cans along the runway, a soldering iron above the runway with which the cans have rubbing contact as they roll along the runway, a guide for directing wire solder against the soldering iron, a feed roller adapted to engage with a solder wire, means for rotating the roller in one direction to feed the solder wire just prior to the arrival of a can at the soldering point, and means for controlling the amount of this rotation and consequent feed of solder.

11. In a can soldering machine, a can runway, means for rolling the cans along the runway, a soldering iron above the runway with which the cans have rubbing contact as they roll along the runway, a guide for directing wire solder against the soldering iron, a feed roll adapted to engage with a solder wire, an arm projecting from the feed roll, a ratchet on the arm engaging with the feed roll in one direction of movement, and an actuating rod depending from the arm and adapted to be lifted upon the approach of a can to actuate the feed roll.

12. In a can soldering machine, a can runway, means for rolling the cans along the runway, a soldering iron above the runway with which the cans have rubbing contact as they roll along the runway, a guide for directing wire solder against the soldering iron, a feed roll, adapted to engage with a solder wire, an arm extending from the feed roll and having mechanism thereon engaging with the feed roll when the arm is moved in one direction, but disengaging therefrom on movement in the other direction, an actuating rod depending from the arm and adapted to be raised just prior to the arrival of a can at the soldering point, and mechanism carried by said rod for regulating the distance through which the rod shall move and the consequent feed of solder wire.

13. In a can soldering machine, a runway for the cans, a soldering iron above the runway and with which the cans have rubbing contact as they roll along the runway, a conveyer moving the cans along the runway, a feed roll adapted to engage with a solder wire, an arm projecting from the feed roll, mechanism on the arm for engaging the feed roll in one direction and disengaged therefrom on movement in the other direction, an actuating rod carried on the arm and depending into the path of movement of the conveyer and adapted to be raised and lowered by the conveyer, and regulating mechanism carried by the upper end of the actuating rod acting to change the amount of feed of solder wire.

14. In a can soldering machine, a runway for the cans, a soldering iron arranged above the runway, a conveyer having blades adapted to roll said cans along the runway and beneath the soldering iron, a feed roll adapted to engage a soldering wire to force it into contact with the soldering iron, an arm projecting from the feed roll engaging with the roll on movement in one direction, and a vertical actuating rod connected to said arm and its lower end depending into the path of movement of said conveyer blades, and means for regulating the amount of descent of said actuating rod between the conveyer blades.

15. In a can soldering machine, a runway for the cans, a soldering iron mounted above the runway, a movable conveyer having blades adapted to roll the cans beneath the soldering iron, a feed roll mounted above the soldering iron and adapted to engage with solder wire, an actuating rod depending into the path of movement of the conveyer blades and adapted to be raised by engagement with each one of the blades, and a connection between said actuating rod and the feed roll whereby upon an upward movement of the rod, the roll shall feed the solder wire forward, but upon a downward movement of the rod the roll shall remain inactive.

16. In a can soldering machine, a runway for the cans, a soldering iron mounted above the runway, a conveyer for rolling the cans beneath the runway having blades projecting therefrom, a vertically reciprocating feed actuating rod having its lower end arranged in the path of movement of said blades adapted to be raised by engagement therewith, a solder feed mechanism actuated by said rod upon its upward movement, and adjustable means carried by the rod for limiting its downward movement between the conveyer blades.

17. In a can soldering machine, a runway for the cans, a soldering iron mounted above the runway, a conveyer for rolling the cans beneath the runway having blades projecting therefrom, a vertically reciprocating feed actuating rod having its lower end arranged in the path of movement of said blades adapted to be raised by engagement therewith, a solder feed mechanism actuated by said rod upon its upward movement, an adjustable stop carried upon said rod, and an abutment with which said stop contacts, said stop and abutment limiting the downward movement of the rod.

18. In a can soldering machine, a runway for the cans, a fixed soldering iron above the runway, a conveyer having blades engaging with the cans and adapted to move the cans along the runway and beneath the soldering iron, a vertically reciprocating feed actuating rod having its lower end arranged in the path of movement of the conveyer blades, said feed mechanism connected to the actuating rod, a spring supporting the upper end of the rod, and means carried by the rod contacting with the spring upon the descent of the rod.

19. In a can soldering machine, a runway for cans, a fixed soldering iron, a conveyer having blades for rolling the cans beneath the soldering iron, a solder feeding mechanism operating on movement in one direction, a vertically reciprocating actuating rod connected to the solder feed mechanism, the lower end of said rod being arranged in the path of movement of the conveyer blades, a fixed support through which the rod passes, a shock-absorbing means surrounding the rod, a sleeve surrounding said means, and an adjustable stop on the rod adapted to contact with the sleeve upon the descent of the rod.

20. In a can soldering machine, a runway for the cans, a fixed soldering iron adjacent to the runway, means for rolling the cans along the runway and beneath the soldering iron, and means for intermittently moving a soldering wire with its end in contact with the face of the soldering iron as a can approaches the soldering point.

21. In a can soldering machine, a runway for the cans, a fixed soldering iron arranged adjacent to the runway, a conveyer adapted to move the cans along the runway and in contact with the fixed soldering iron, mechanism for feeding solder against the face of the iron, an actuating rod connected to said mechanism and depending into the path of the conveyer, and an extension from said rod extending in an opposite direction to the direction of movement of the conveyer, said extension being gradually upwardly inclined and adapted to be engaged and reciprocated by the conveyer in its forward movement.

22. In a can soldering machine, a runway, a fixed soldering iron, a conveyer movable along the runway to carry cans successively beneath said iron, said conveyer having upwardly extending blades, solder feeding mechanism, a reciprocating rod connected to the solder feeding mechanism and depending into the path of movement of the conveyer blades, said rod having an extension upwardly inclined in a direction opposite to that in which the conveyer blades are moving, and adapted to be engaged by successive conveyer blades to intermittently raise the actuating rod.

23. In a can soldering machine, a runway, a fixed soldering iron, a conveyer having upwardly projecting blades and adapted to move the cans successively into engagement with the fixed soldering iron, solder feeding mechanism, a reciprocating actuating rod depending from the solder feeding mechanism into the path of movement of the conveyer blades, and having an upwardly inclined extension extending in a direction opposite to the direction of movement of the conveyer blades and adapted to be engaged and lifted by successive conveyer blades, the upper end of the actuating rod being provided with an adjustable stop for limiting the downward movement of the actuating rod.

24. In a can soldering machine, a runway, a soldering iron adjacent to the runway, a conveyer adapted to move cans successively into engagement with the soldering iron, a feed roll adapted upon movement in one direction to feed solder wire against said iron, a vertically reciprocating actuating rod, a pawl mounted upon the actuating rod and adapted to engage the feed roll when the rod is raised, a support through which the upper end of the rod passes, a shock-absorber mounted on the support and adapted to receive the shock of the rod when said rod falls, an adjustable stop on the rod for controlling the amount of descent thereof, and an upwardly inclined extension on the lower end of the rod adapted to be engaged by the conveyer blades and extending in a direction opposite to the direction of movement of the blades.

25. In a can soldering machine, a framework having vertical standards, a runway supported on the framework, a fixed soldering iron, a conveyer movable along the runway and having blades adapted to engage with said cans and roll them beneath the iron, a vertically reciprocating actuating rod having its lower end extending into the path of movement of the conveyer blades and having an extension from its lower end upwardly inclined in a direction opposite to that of the movement of the conveyer blades, a solder feed wire, means on the actuating rod engaging the solder feed roll upon an upward movement of the rod, means for regulating the descent of the rod, and a link pivoted to the rod at one end and at the other pivoted to said framework.

26. In a can soldering machine, opposed parallel runways, a fixed soldering iron for each of the runways extending longitudinally along the same and with which the cans have rubbing contact as they roll along the runways, opposed solder feed rolls mounted above the runways and adapted to feed a plurality of soldering wires against the soldering irons upon movement in one direction, an actuating device for each of said feed rolls, and means for operating said actuating device upon the passage of a can past the same.

27. In a can soldering machine, opposed parallel runways, opposed soldering irons and with which the cans have rubbing contact as they roll along the runways, one for each runway, a conveyer having upwardly extending blades and adapted to roll the cans along each runway successively beneath the soldering iron, a plurality of solder guides, opposed parallel solder feeding rolls mounted above the guides and adapted to feed solder wire into the guides upon movement of the rolls in one direction, a step-by-step device for intermittently rotating each of the rolls, and means depending into the path of movement of the conveyer blades for actuating the solder feed rolls upon the passage of the conveyer blades in engagement with said means.

28. In a can soldering machine, opposed parallel can runways, soldering irons and with which the cans have rubbing contact as they roll along the runways, one for each of the runways, a conveyer having upwardly extending blades adapted to move the cans beneath the irons, opposed solder feeding rolls mounted above the runways, and adapted each to feed a plurality of solder wires to said irons, and vertically reciprocating actuating rods engaged with said rolls to rotate the same upon movement of the rods in one direction, said rods having an extension upwardly inclined in a direction opposite to the direction of movement of the solder blades and adapted to be engaged by the successive blades upon a movement of the conveyer.

29. In a can soldering machine, a supporting framework, opposed parallel can runways, longitudinally extending soldering irons and with which the cans have rubbing contact as they roll along the runways, one for each of the runways, a plurality of wire carrying reels mounted upon the framework, a plurality of solder guides through which the wires from said reels passes said guides controlling the soldering wires at a plurality of points along the soldering irons, mechanism for intermittently drawing the wires from the reels and feeding it through the guides to the soldering irons, and means for actuating said feeding mechanism in accordance with the passage of cans along said runways.

30. In a can soldering machine, a framework having opposed vertical standards, opposed parallel runways supported on said standards, soldering irons supported adjacent to each of the runways and with which the cans have rubbing contact as they roll along the runways, a conveyer located between the runways and having upwardly extending blades, said blades being adapted to roll the cans along the runways and beneath the soldering irons, a longitudinally extending casing supported on the framework above the conveyer and having a series of bearings therein, opposed parallel feed rolls, one above each of the runways and supported in said bearings, a series of solder-carrying reels supported above the feed rolls, a plurality of guides extending from the casing downward to each of the soldering irons and adapted to present said solder wires against the soldering irons at a plurality of points, vertically reciprocating actuating rods, one for each of the feed rolls, having means for rotating the feed rolls upon a lifting movement of the rods, means for adjustably limiting the descent of the rods, said rods being actuated in accordance with the passage of conveyers along the runway, and independent means for holding each of the solder wires in engagement with its feed rolls.

31. In a can soldering machine, the combination with a can runway and a fixed soldering iron above the runway and with which the cans have a rubbing contact as they roll along the runway and means for moving cans successively into engagement with the soldering iron, of means for intermittently feeding a plurality of soldering wires against the soldering iron in accordance with the successive arrival of cans into engagement with the iron.

32. In a can soldering machine, a can runway and a fixed soldering iron above the runway and with which the cans have a rubbing contact as they roll along the runway, means for moving a can into engagement with the soldering iron, and means for feeding a solder wire forward a definite distance against the iron just prior to the arrival of said can at the soldering point.

33. In a can soldering machine, a runway, a soldering iron, means for rolling cans along the runway in engagement with the soldering iron, means for feeding a soldering wire against the face of the iron a definite distance just prior to the arrival of a can at the soldering point, and means for regulating the amount of solder feed.

34. In a can soldering machine, a runway, a longitudinally extending soldering iron, means for rolling a succession of cans along the runway and in engagement with the soldering iron, and means for feeding a series of soldering wires against the face of said iron a definite amount just prior to the arrival of a can before each of the soldering points.

35. In a can soldering machine, a supporting framework, a trackway for cans, a soldering iron above and adjacent thereto and with which the cans have a rubbing contact as they roll along the runway, and iron supporting bars attached at one end to said iron and at the other adjustably attached to the supporting framework.

36. In a can soldering machine, a runway for the cans, a soldering iron supported above and adjacent thereto and with which the cans have a rubbing contact as they roll along the run-way, said iron being adjustable vertically and laterally and having extensions by which it may be shifted and adjusted.

37. In a can soldering machine, a supporting framework, a trackway for cans, a soldering iron supported above and adjacent thereto and with which the cans have a rubbing contact as they roll along the runway, a depending supporting bar for the soldering iron, and a transversely extending bar connected to the iron, said bars having means at their extremities whereby they and the soldering iron may be adjustably supported.

38. In a can soldering machine, a trackway for the cans, a supporting framework extending above the trackway, a can soldering iron supported adjacent to the trackway, a depending resilient supporting iron attached at its lower end to the soldering iron and at its upper end adjustably attached to the framework, and a transversely extending iron attached at one end to the soldering iron and at its other adjustably attached to the framework.

39. A longitudinally extended soldering iron having on one face thereof a solder-gathering tapering tongue, the lowest portion of which is coincident with the bottom edge of the iron.

40. A soldering iron, consisting of a longitudinally extended plate having on one face thereof a series of solder-gathering tongues, each tongue extending downward to the lower edge of the iron.

41. In a can soldering machine, a longitudinally extended soldering iron having on the inner face thereof a plurality of solder-gathering tapering tongues, the pointed ends of which extend down to the lower edge of the iron, in combination with mechanism for feeding solder against each one of said tongues.

42. In a can soldering machine, a longitudinally extended soldering iron, means located on one face of the iron for heating the same, a series of solder-gathering tapering tongues formed on the other face of said iron, the lower ends of said tongues extending to the lower edge of the soldering iron, in combination with mechanism for feeding a plurality of solder wires against the face of said iron in contact with said tongues.

43. In a can soldering machine, a fixed soldering iron having on one face thereof a plurality of pairs of downwardly converging grooves defining downwardly extending tapered solder-gathering tongues, each tongue extending to the lower edge of the soldering iron, in combination with means for heating said iron, and means for feeding a plurality of soldering wires against the face of said tongues.

44. In a can soldering machine, a soldering iron having opposed downwardly converging grooves on one face thereof, defining an intermediate solder-gathering tongue the lower ends of said grooves extending to the lower edge of the soldering iron, means for heating the iron, and means for feeding a soldering wire with its end against said tongue.

45. In a can soldering machine, a soldering iron having a downwardly extending flange and an outwardly extending flange, heating means arranged behind the iron and between said flanges, and means for feeding a plurality of soldering wires against the face of said downwardly depending flange, the face of said flange being formed with a series of downwardly converging grooves between each pair of which grooves said solder wire is fed.

In testimony, that I claim the foregoing as my own, I have hereto affixed my signature in the presence of two witnesses.

WALTER J. PHELPS.

Witnesses:
JOHN H. SIGGERS,
DAVID R. WAGNER.